United States Patent Office

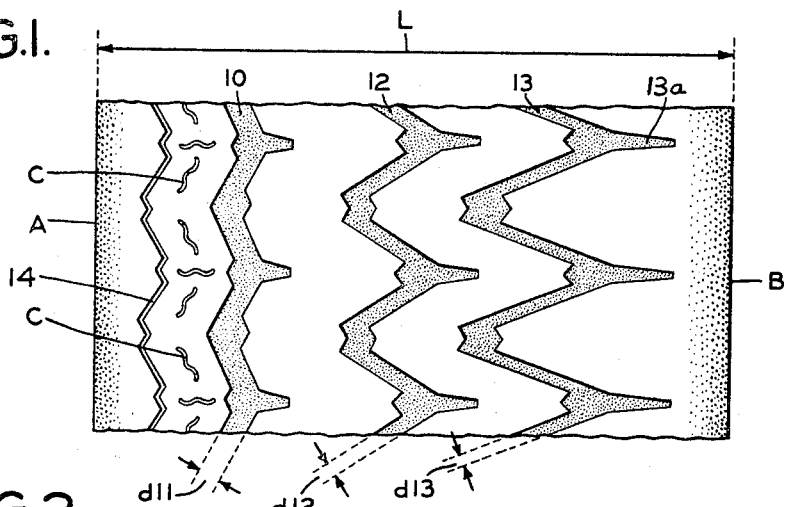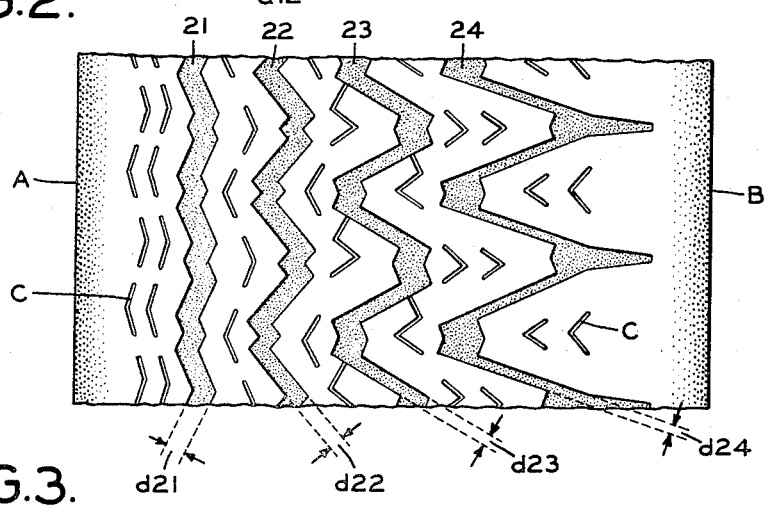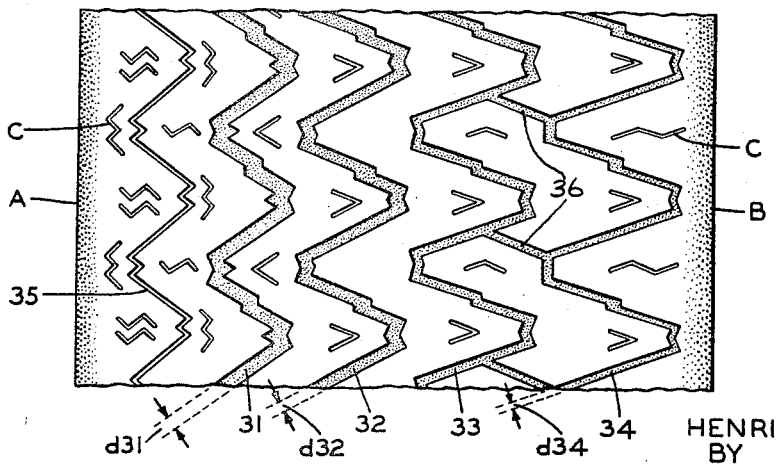

3,405,753
Patented Oct. 15, 1968

3,405,753
PNEUMATIC TIRE TREADS
Henri Verdier, Beauregard-l'Eveque, France, assignor to Compagnie Generale des Etablissements Michelin, raison sociale Michelin & Cie, Clermont-Ferrand, Puy-de-Dome, France
Filed July 21, 1966, Ser. No. 566,868
Claims priority, application France, July 24, 1965, 25,939
10 Claims. (Cl. 152—209)

ABSTRACT OF THE DISCLOSURE

An asymmetrical tire tread is formed with a plurality of circumferentially extending wavy grooves. The wavy shapes of successive grooves from the outer edge of the tread toward the inner edge of the tread increase in amplitude.

---

The present invention relates to improvements in pneumatic tires and more particularly to the arrangement and the form of the moldings or grooves in the tread of tires intended to be operated at high speeds.

Recent investigations have brought into focus the importance of providing tire covers with an asymmetrical internal structure. These investigations show that a tire operates under asymmetrical conditions. For example the outside and the inside are subjected to different forces, especially in curves, and this fact should be taken into consideration in the construction of a tire, and especially in developing the structure of its reinforcement. These considerations also lead to the conclusion that it is advantageous to provide the tread with grooves which recur in a non-uniform manner over the entire width as well as the entire periphery of the tread.

The principles to be observed in order to obtain an appreciable advantage due to non-uniform tread construction have not been recognized or suggested heretofore. Tires are known which have two completely different types of tread patterns on opposite sides of the median place of symmetry of a tire, each pattern being selected to provide a specific function and to give the tire a special characteristic. For example, one of the sides of the tread is molded in such manner as to take care of holding ability on loose ground and the other side to operate on firm ground. However, an asymmetrical molding thus conceived merely constitutes a bad compromise which cannot be as effective as a tread of a suitable type of the same width.

In contrast to the known solutions which do not really involve asymmetry, the present invention relates to an improved tire and tread therefor by means of which the entire rolling surface participates, due to the absence of any symmetry, in attaining simultaneously high qualities of stability during rolling, resistance to wear and tear, improved roadability on roads of all kinds, quietness and the like.

The tire tread, in accordance with the invention, comprises a certain number of grooves (and interposed lands or ridges) obtained by the repetition, all around the tread, of elementary shapes forming an asymmetrical total, and it is characterized more particularly in that the amplitude of the various shapes and/or the intervals between consecutive grooves increase from the outside towards the inside the tire.

The amplitude of a wavy, zigzag, sinuous or the like groove shape hereinafter referred to as "wavy" repeated circumferentially of the tread should be considered parallel to the axis of the tire. The same is true for the intervals or spacings between consecutive grooves, these latter normally being in phase or not being out-of-phase to any considerable extent.

In accordance with a preferred form of the invention, the amplitudes and/or the intervals between consecutive grooves are in or, substantially in, arithmetic progression.

Any desired number of circumferential grooves may be present in the tread. However, it is preferable, and generally also sufficient, to provide three, four or five such grooves, depending on the width of the tread.

A further feature of the invention is an increase in the width of the groves from the inner side to the outer side of the tread, with the widest grooves having the smallest amplitude. However, it is advantageous to provide a narrower groove adjacent the outer edge of the tread.

Another feature of the invention is a tread groove arrangement in which the groove with the greatest amplitude extends over a width which is less than one-third of the width of the tread and is provided with transverse extensions or is connected with an adjacent groove by means of other substantially transverse narrow grooves to obtain a network of communicating grooves from the inner edge of the tread, such network having a width of at least one-third of the width of the tread.

Although in accordance with the invention the grooves in the tread have, in general, continuous zigzag, sinuous or wavy forms, it is possible to provide between adjacent grooves other grooves or slits of different form and also to provide for a slight staggering between the crests and troughs of the grooves.

With treads of the type described, a number of very substantial advantages are obtained. Thus, by providing a groove adjacent the outer edge of the tread, which has a low amplitude, that is, more closely approaches a straight groove than the other grooves, better traction is afforded between the tire and the road, during turning since the edges of the groove are presented more nearly perpendicular to the major component of forces exerted on the tread. Moreover, the ribs on opposite sides of such a groove are more continuous and present a greater bearing surface to the roadway, and thus are more wear-resistant, an advantage in view of the fact that tires tend to wear more rapidly at their outer edges on the front wheels of a vehicle than at their inner edges. On the other hand, providing grooves of greater amplitude at the inner edges of the tire provides blocks or ribs therebetween having their edges more closely perpendicular to the direction of rolling of the tires and thus afford better traction for the tire. Moreover, by varying the amplitude of the grooves in the tread, there is less tendency for the tread to be noisy on hard surface roadways.

For a better understanding of the present invention, reference may be had to the accompanying drawing, in which FIGURE 1 is a developed plan view of a portion of a tread for a pneumatic tire embodying the present invention;

FIGURE 2 is a developed plan view of a portion of a modified form of tread embodying the invention; and FIGURE 3 is a developed plan view of a portion of still another form of tread embodying the present invention.

As represented in the drawings, the treads disclosed in FIGURES 1 to 3 are suitable for a 120 x 380 mm. tire and have a width L of approximately 120 mm. The outer edge of the tread as the tire is applied to the vehicle wheel is indicated as A and its inner edge is indicated as B. In the tread shown in FIGURE 1, three main grooves 10, 12 and 13 are provided which have amplitudes measured from crest to trough transversely of the tire of approximately 8 mm., 14 mm. and 20 mm., respectively. Transverse extensions 13a on the crests of the groove 13 cause this groove to span about one-third of the width of the tread. These grooves have average widths $d11$, $d12$ and $d13$, respectively, of 4 mm., 3.8 mm. and 2.5 mm. A narrow groove 14 and discontinuous slits of short length C are provided between the groove 10 and the outside edge A of the tread.

The tread as shown in FIGURE 2 has four main grooves 21, 22, 23 and 24, the amplitudes measured from crest to trough being respectively, 3 mm., 5 mm., 10 mm. and 20 mm. The average spacing between the grooves 21 and 22 and between 22 and 23 is approximately 12 mm., while the spacing between the grooves 23 and 24 is about 19 mm. The average widths $d21$ to $d24$ of these grooves are, respectively, approximately 3.5 mm., 3.5 mm., 3.0 mm. and 2.0 mm. Slits C are formed between the grooves 21 and 22 and between the groove 21 and the edge of the tire. Other slits may also be provided in the tire tread as shown in FIGURE 2.

The tread in FIGURE 3 has four comparatively wide grooves 31 to 34 and a narrower groove 35 between the tire edge A of the tread and the groove 31. The average widths $d31$ to $d34$ of the grooves 31 to 34 are, respectively, 3.0 mm., 2.5 mm., 2.0 mm. and 1.5 mm. Their amplitudes are, respectively, approximately 8 mm., 10 mm., 12 mm. and 14 mm. Inasmuch as the groove 34 extends over a width of a tread which is less than one-third the width of the tread, it is connected to the adjacent groove 33 by means of narrow channels or grooves 36 substantially transverse to the tread and thereby provides a network of grooves 33, 34 and 36 more than one-third of the width of the tread.

The average transverse spacings between the grooves 31 to 34 are approximately 16 mm. between grooves 31 and 32, 19 mm. between grooves 32 and 33, and 22 mm. between grooves 33 and 34. Other slits C of shorter length are distributed over the entire width of the tread.

It will be apparent from the arrangements of the grooves shown in FIGURES 1 to 3 of the drawings that the amplitudes of these grooves vary in approximately arithmetic progression and the average width of the grooves decreases as the amplitude of the groove increases, substantially in proportion thereto. In this way, the tread becomes, as described above, asymmetrical, but in a progressive fashion from the outer to the inner edge and thereby modifies the road-contacting surfaces likewise in asymmetrical fashion so that there is no abrupt change in the rib and groove arrangement transversely of the tire. The asymmetrical arrangement of the grooves and the treads, lands or ribs between them is such as to enhance the operating life of the tire due to the greater road-contacting surface near the outer edges of the tread while enhancing the traction of the inner portion of the tread. Inasmuch as this change in tractive effect and wearing effect is progressive across the tire rather than abrupt, the riding comfort provided by the tire is not lessened and the asymmetrical conditions under which the tire normally operates are compensated for by the tread pattern, without introducing tread deformations in the "footprint" of the tire.

It will be understood that the tread is susceptible to further modification, for example, instead of angular or zigzag grooves, as illustrated in the drawing they may be of a more curved or sinuous (wavy) form and they may be interrupted at intervals as well as having interspersed between them and particularly at the outer edge of the tire, narrower grooves of the same or different shape in order to further improve roadability, especially under wet conditions. Moreover, the crest and troughs of the wavy grooves may be offset or staggered somewhat from each other circumferentially of the tire in order to avoid development of resonance in the tire during operation at different speeds.

Inasmuch as the new treads are susceptible to considerable modification without departing from the invention, the forms of the invention illustrated should not be considered as limiting the scope of the invention as defined in the following claims.

I claim:
1. A tire comprising a tread having an outer edge and an inner edge and a plurality of circumferentially extending spaced grooves therein, more than one of said grooves having wavy shapes, the wavy shapes of consecutive grooves from said outer edge toward said inner edge increasing in amplitude.

2. The tire set forth in claim 1 in which the spacing between consecutive grooves increases from said outer edge toward said inner edge.

3. The tire set forth in claim 1 in which said consecutive grooves are of decreasing width from said outer edge toward said inner edge.

4. The tire set forth in claim 2 in which said consecutive grooves are of decreasing width from said outer edge toward said inner edge.

5. The tire set forth in claim 1 in which the amplitudes of said grooves vary in substantially arithmetic progression.

6. The tire set forth in claim 1 in which the spacing between consecutive grooves varies in substantially arithmetic progression.

7. The tire set forth in claim 5 in which the spacing between consecutive grooves varies substantially in arithmetic progression.

8. The tire set forth in claim 4 comprising a circumferentially extending narrow groove in said tread between said outer edge and said plurality of grooves.

9. The tire set forth in claim 1 in which the groove of wavy shape nearest said inner edge of said tread has a lateral extent of about one-third the width of said tread.

10. The tire set forth in claim 1 comprising a plurality of substantially transversely extending grooves connecting consecutive grooves adjacent to said inner edge of said tread and forming a network of grooves spanning at least one-third the width of said tread.

References Cited

UNITED STATES PATENTS 3,094,157  6/1963  Klohn _____ 152—209

DRAYTON E. HOFFMAN, *Primary Examiner.*